United States Patent [19]

Reiss

[11] 4,059,011
[45] Nov. 22, 1977

[54] METHOD AND FORCE DETERMINING APPARATUS FOR ICE BREAKING VESSELS

[76] Inventor: Joseph M. Reiss, 1757 Harvard St., NW., Washington, D.C. 20009

[21] Appl. No.: 605,552

[22] Filed: Aug. 18, 1975

[51] Int. Cl.$^2$ .................... G01L 5/16; G01N 19/02
[52] U.S. Cl. ........................ 73/133 R; 73/9; 73/147; 73/178 R; 73/DIG. 3
[58] Field of Search ............. 73/9, 148, 182, 186, 73/DIG. 2, DIG. 3, 147, 133 R; 336/30, 119

[56] References Cited

U.S. PATENT DOCUMENTS

| | | |
|---|---|---|
| 2,214,710 | 9/1940 | von den Steinen ............ 73/148 X |
| 2,918,816 | 12/1959 | Ormond ............................. 73/147 |
| 2,935,870 | 5/1960 | Lyons, Jr. ........................... 73/9 X |
| 3,286,528 | 11/1966 | Jullien-Davin ............. 73/DIG. 3 X |
| 3,383,914 | 5/1968 | MacArthur ....................... 73/147 |
| 3,482,444 | 12/1969 | Jefferson .......................... 73/186 |
| 3,575,054 | 4/1971 | Glista ......................... 73/DIG. 3 |
| 3,845,434 | 10/1974 | Carter ............................... 336/30 |

Primary Examiner—Richard C. Queisser
Assistant Examiner—John S. Appleman
Attorney, Agent, or Firm—Burns, Doane, Swecker & Mathis

[57] ABSTRACT

A method and apparatus for providing data related to the ice breaking efficiency of a hull of a vessel as the vessel passes through ice, and particularly for providing data related to the frictional forces experienced on the hull of the vessel as the vessel passes through ice. Movable means is carried on the hull of the vessel generally flush with the hull for displacement in response to forces applied thereto as the vessel passes through ice. The displacement of said movable means relative to the hull of the vessel is determined as a manifestation of frictional forces between the hull of the vessel and the ice. The movable means preferably comprises a generally coplanar relation therewith and flush with the outer hull skin. The plate is mounted on a plate suspending means which permits omnidirectional movement of the plate at least in the plane of the hull. In one embodiment, the degree of movement of the plate is sensed by a plurality of electromagnets carried by the hull of the ship and disposed at spaced positions adjacent the edges of the plate, with the electromagnets cooperating with a plurality of electrical conductors carried by the plate adjacent respective ones of the plurality of electromagnets, the electrical conductors producing electrical signals related to the degree of movement of the plate relative to the plurality of electromagnets. In another embodiment, plate movement is sensed by displacement probes in contact therewith and arranged to provide electrical signals representing displacement.

18 Claims, 11 Drawing Figures

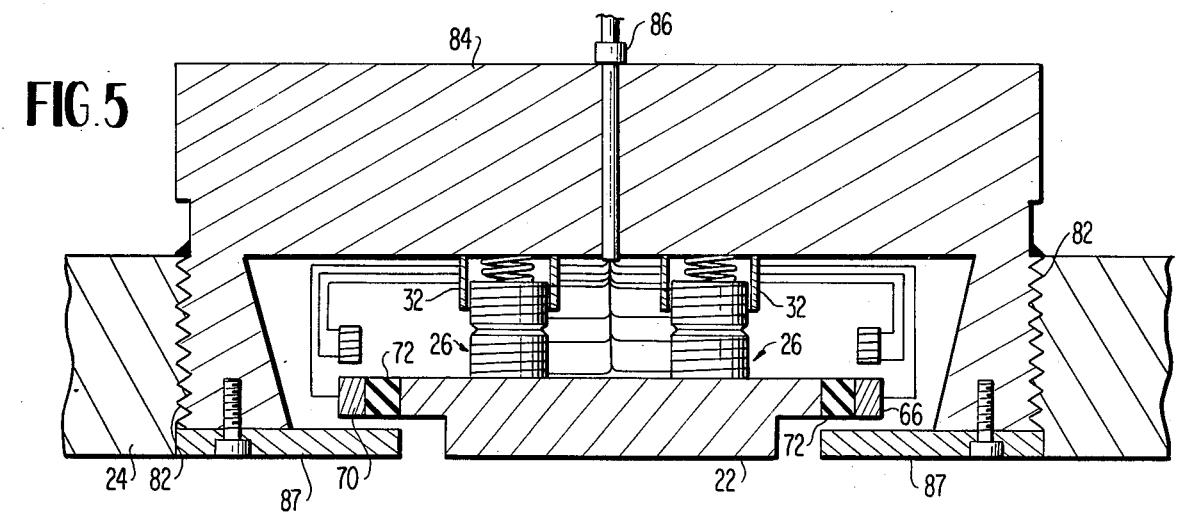
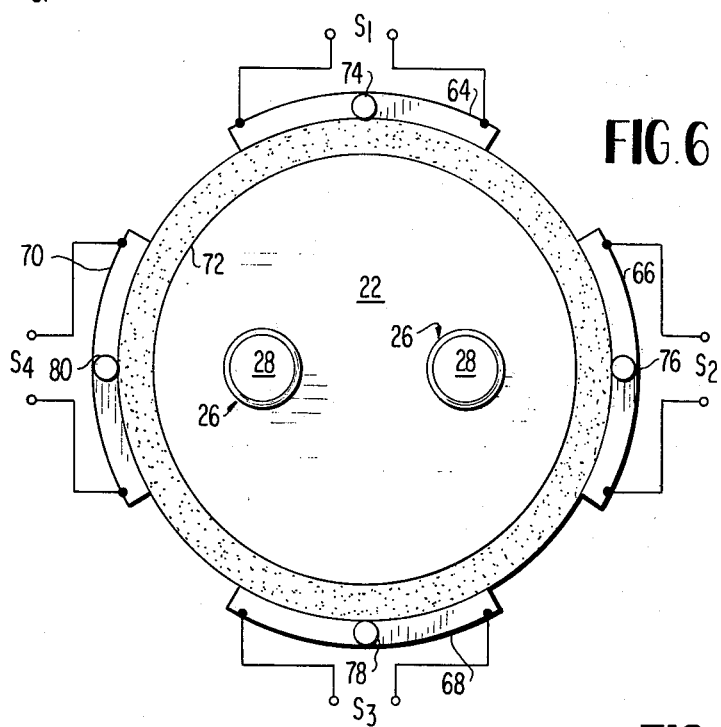
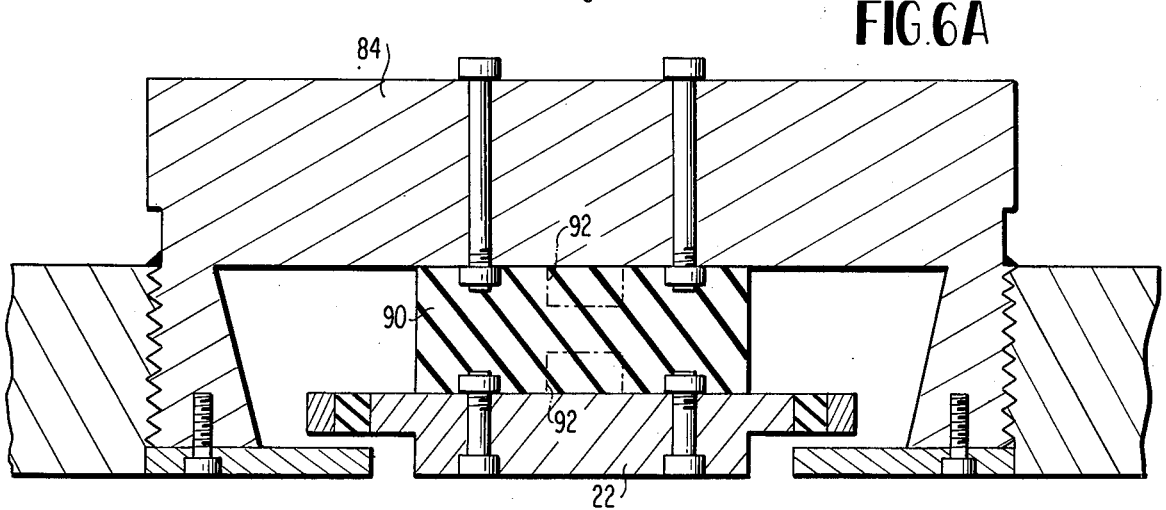

METHOD AND FORCE DETERMINING APPARATUS FOR ICE BREAKING VESSELS

BACKGROUND OF THE INVENTION

The present invention relates to ice breaking vessels and, more particularly to a method and system for obtaining data indicative of forces experienced between the hull of a vessel and ice as the vessel passes through the ice so as to provide data for design purposes.

Vessels designed for ice breaking, e.g. Class A vessels with ice strengthened hulls, are primarily designed in accordance with theoretically posed criteria. Typically, for example, the structural design of the hull and the selection of a power plant are determined through theoretical calculations with some degree of tank testing of the resultant designs.

Actual conditions vary, of course, with regard to ice age, thickness, the extent of the ice field and other factors which are difficult to model theoretically and to reproduce in a tank environment. Moreover, although relatively accurate data may be gathered from tank testing of ice breaker designs, it is difficult to obtain the types of data which are helpful in ice breaker design even under controlled tank testing conditions.

For example, various methods have been devised to determine the stresses encountered on the hull of a vessel. A typical technique employed to monitor stresses involves the use of a strain gauge or a pressure transducer on the hull of the vessel. The use of strain gauges and pressure transducers provides very limited data as to the forces experienced on the hull of the vesel. Moreover, it is difficult to get accurate data from a strain gauge, particularly with respect to a localized area of the vessel's hull since forces applied at any one location are assumed by the numerous structural members within that area. Consequently, the stresses are transmitted throughout the localizd vicinity to surrounding structures, decreasing in intensity proportional to distance. Therefore, as simultaneous forces act upon the structure, an overlapping effect is derived which can lead to inaccurate assumptions.

It is accordingly an object of the present invention to provide a novel method and system for providing empirical data useful in the design of ice breaking vessels, whereby actual hull skin forces are measured avoiding the interrelationship of attendant structural members.

It is another object of the present invention to provide a novel method and system for providing empirical data related to frictional forces and thus frictional losses experienced on the hull of the vessel while it passes through ice.

It is yet another object of the present invention to provide a novel method and system for testing the ice breaking efficiency of a hull of a ship as the ship passes through ice wherein the measuring system does not protrude from the natural lines of vessel's hull.

It is a more specific object of the present invention to provide a method and system for testing the ice breaking efficiency of an ice-strengthened hull as the ship passes through ice derived by the measurement of frictional losses experienced on the hull in response to displacement of a movable member flush with the hull wherein the displacement is generally in the plane of the hull.

These and other objects and advantages are accomplished in accordance with the present invention as will become apparent to one skilled in the art to which the invention pertains from a perusal of the following detailed description when read in conjunction with the appended drawings.

BRIEF DESCRIPTION OF THE DRAWINGS

FIG. 5 is a view in partial cross section of another embodiment of the detection system according to the present invention;

FIG. 6 is a top plan view of the detection plate of FIG. 5;

FIG. 6A is a view in elevation of an alternative embodiment of the plate suspension means of FIG. 5;

DETAILED DESCRIPTION

Figure 1:
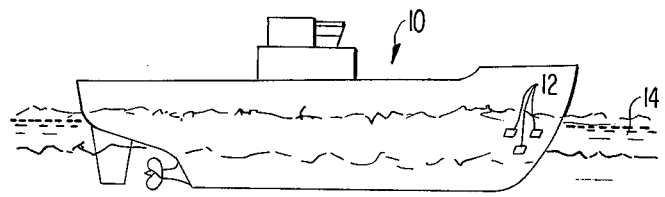
FIG. 1 is a view in elevation of an ice breaking vessel employing the present invention.

Referring now to FIG. 1, the present invention is intended to provide useful data regarding the forces exerted on the hull of an ice breaker or other vessel fitted with an ice strengthened hull as is generally depicted by the ship 10. In this connection, the hull of the ship 10 is provided with one or more detector assemblies 12 described hereinafter in greater detail.

The detector assemblies 12 may be positioned at points on the hull of the ship at which maximum frictional forces are expected as the ship 10 passes through ice generally indicated at 14. For example, the detectors 12 may be positioned at points of maximum curvature of the ship, e.g. at points of maximum angular deviation of the hull from the center line of the ship. As will be described hereinafteer in greater detail, the detector 12 are contacted by the ice 14 as the ship 10 passes through the ice, thereby providing an indication of the forces, and particularly the frictional forces to which the hull of the ship is subjected in passing through the ice.

Figure 2:
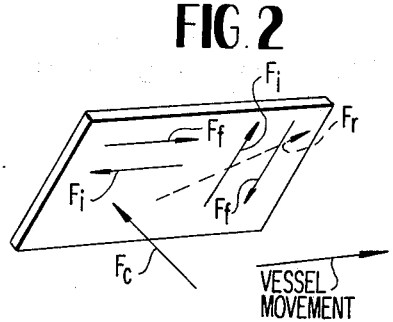
FIG. 2 is a schematic diagram illustrating the forces to which a detection plate mounted on the vessel's hull is subjected.

In the preferred embodiment of the invention, each of the detectors 12 includes a plate which is contacted by the ice 14 as the ship passes through the ice. FIG. 2 illustrated some of the forces to which the plate is subjected by the ice. Since these forces are the same forces which would act on the hull of the ship at that particular location of the detector plate, the detection of these forces provides an indication as to the forces experienced by the hull of the ship at various locations on the hull.

Referring now to FIG. 2, the hull of the ship is subjected to numerous forces including frictional compressive forces having components as shown on the plate of the detector assembly 12 depicted in FIG. 2. The compressive forces $F_c$ are directd inwardly toward the interior of the ship. Assuming that the ship is moving to the right, the frictional forces $F_i$ between the hull and the ice are directed horizontally and vertically as illustrated. The strength of the hull must be sufficient to counteract the compressive forces $F_c$ and the ship's power plant must be sufficient to overcome the frictional forces $F_i$ between the hull of a ship and the ice in order to move the ship through the ice. Accordingly, the counteracting frictional forces $F_f$ or a resultant force $F_r$ must be supplied as the ship passes through the ice. The measurement of the frictional forces $F_f$ is therefore desirable in the design of ice breaker hulls both in order to determine optimum hull designs and to determine minimum power requirements, e.g. frictional horsepower losses.

Figure 3:
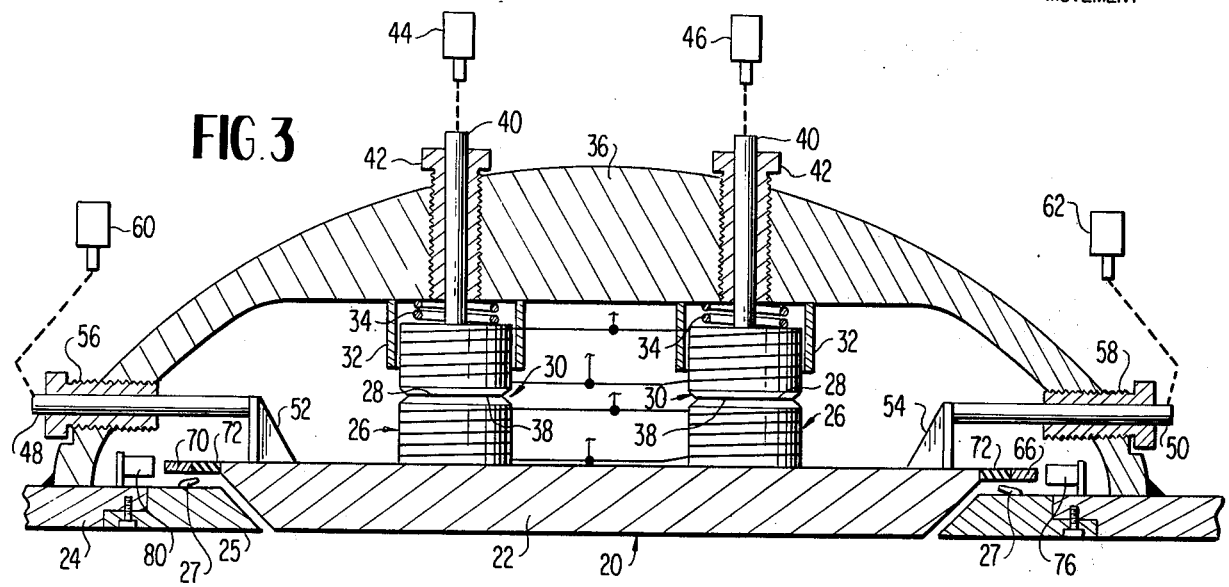
FIG. 3 is a view in partial cross section of a force measuring system in accordance with the present invention.
Figure 4:
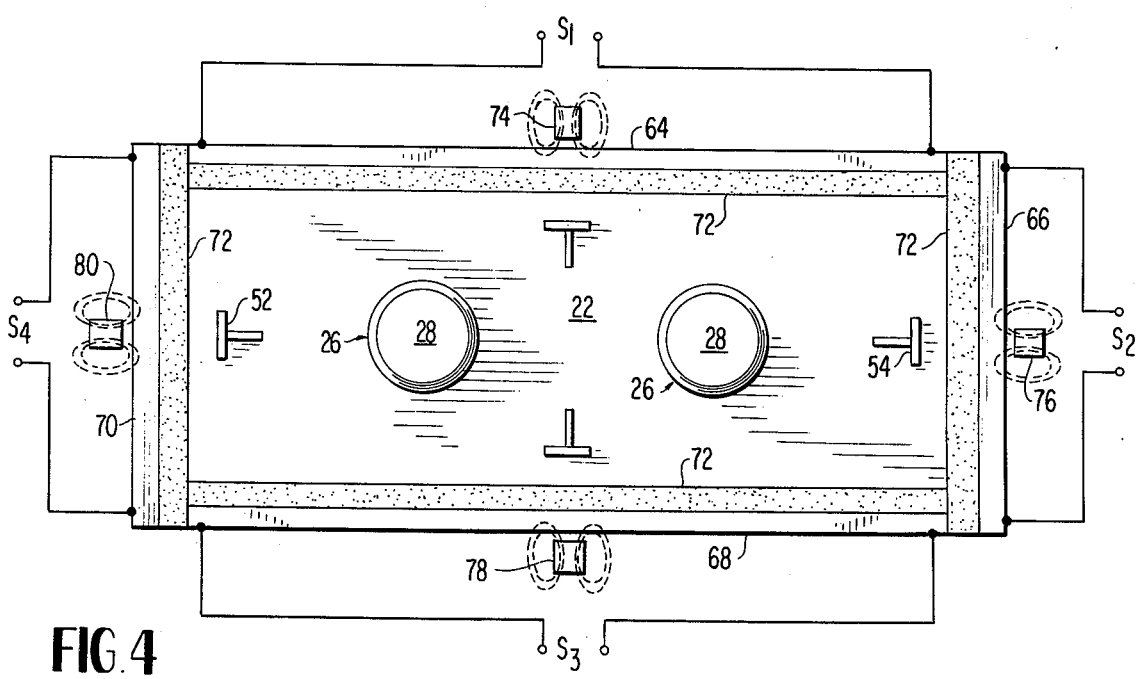
FIG. 4 is a top plan view of the movable plate of the detection system of FIG. 3.

In accordance with the present invention, data relating to frictional losses along the hull of the ship may be obtained through the use of the detectors previously mentioned and embodiments of which are illustrated in FIGS. 3-6. Referring now to FIG. 3, wherein one embodiment of the detector 12 of FIG. 1 is illustrated, an aperture generally indicated at 20 is provided in an appropriate location in the hull of the ship. As was previously mentioned, the location my be determined in accordance with the curvature of the ship's hull and the level at which the ice contacts the ship. Within the aperture 20, a plate 22 is suspended flush with the hull 24 of the ship in a manner which provides omnidirectional movement of the plate 22 from a biased reference position. A removably mounted inspection plate 25 may be provided as illustrated to permit access to the detector assembly. Moreover, heat may be applied to the vicinity of the space between the plate 22 and the plate 25 through the use of resistive heating or a steam fitting as indicated at 27.

In the illustrated embodiment, the suspension means comprises first and second electromagnets 26 secured to the plate 22. The electromagnets 26 are connected to a source of electrical energy as described hereinafter and are wound in a conventional manner so that the pole faces 28 produces a magnetic field of one magnetic polarity, e.g. south poles. Third and fourth electromagnets 30 are mounted so as to be carried by the hull of the ship preferably in a manner which permits axial movement of the electromagnets against a resilient biasing force directed outboard of the hull of the ship. For example, the electromagnets 30 may be mounted in cylindrical members 32 coaxial therewith and suitable compression springs may be provided between the electromagnets 30 and a support member 36 connected to the hull of the ship in a suitable manner. The electromagnets 30 are connected to a source of electrical energy and are wound in a conventional manner so as to provide magnetic polarities at the pole faces 36 thereof opposite the magnetic polarities at the pole faces 28 of the electromagnets 26. The electromagnets 26 are positioned on the plate 22 so that the pole faces 28 are in alignment with the pole faces 38 with the plate in a reference position, i.e., a centered position relative to the aperture 20.

Displacement probes 40 may be connected to the electromagnets 30 so as to provide an indication of the compressional forces applied to the outer face of the plate 22. The displacement probes 40 may extend through the support member 36 in suitable, relatively watertight adaptors 42 as illustrated. The probes 40 may be connected to supply electrical signals related to the displacement of the electromagnets 30 in any suitable conventional manner so as to provide electrical signals related to compressional forces.

For example, the displacement probes 40 may be mechanically coupled to potentiometers 44 and 46 in a suitable manner so as to move the arms of the potentiometers 44 and 46 in proportional to the displacement of the electromagnets 30 against the springs 34. The signal supplied by the potentiometers 44 and 46 may be utilized in the analysis of the forces experienced on the plate 22 (and thus on the hull of the ship) through the use of various analyzing means such as empirically derived curves relating signal magnitude and force.

A plurality of displacement probes, two of which are illustrated at 48 and 50, are mounted to be displaced proportionally to the displacement of the plate 22 generally in the plane of the hull of the ship. In the illustrated embodiment, for example, the displacement probes 48 and 50 are mounted generally parallel to the outer surface of the plate 22 and are urged in a suitable manner against respective members 52 and 54 connected to the plate 22. The probes 48 and 50 extend through the support member 36 in suitable, generally watertight adaptors 56 and 58 and are connected to produce electrical signals related to the displacement of the displacement probes from an established reference position of the plate 22. For example, the potentiometers 60 and 62 may be suitably connected to be driven by the respective displacement probes 48 and 50 to provide signals proportional to the displacement of the plate 22 from a reference position established by the magnetic plate suspension means. As will be described hereinafter in greater detail, the signals from the potentiometer 60 and 62 may be utilized either to check the reference position of the plate 22 or to determine, through the displacement of the plate 22, the frictional forces between the plate 22 and the ice through which the ship passes.

As was described above, the displacement probes 48 and 50 may be utilized to provide an indication of frictional forces experienced by the plate 22 and therefore by the hull of the ship in the vicinity of detector 12. With continued reference to FIG. 3 and with reference now to FIG. 4, a magnetic movement sensing system may be provided along the edge of the plate 22 to provide signals S1, S2, S3 and S4 related to the frictional forces and thus the losses experienced along the outer surface of the plate 22.

The magnetic movement sensing system generally includes a magnetic field sensing means and a magnetic field producing means. The field sensing means may comprise a plurality of electrically conductive strips or wires 64–70 carried along the edges of the plate 22 and insulated from the plate 22 by electrically insulative strips 72. Suitable magnetic field producing means 74–80 such as electromagnets are mounted in a suitable manner in fixed positions adjacent the respective field sensing conductors 64–70. In the illustrated embodiment of FIGS. 3 and 4, each magnetic field producing means is oriented with respect to the field sensing means such that an electrical current is induced in the field sensing means (i.e., in the conductor 64–70) in response to variations in the distance between the field sensing and field producing means. For example, a signal S1 having variations related to changes in spacing between the conductor and the electromagnet 74 will be produced as the plate 22 moves vertically. Similarly, signals S2 and S4 will be produced in response to movement of the plate 22 in a horizontal direction.

As will be appreciated by one skilled in the art, the signals S1–S4 will reflect, by their magnitude and duration, the velocity of the displacement of the plate 22 and the time in which the displacement occurs. Accordingly, the signal energy (the combined duration and magnitude of the signals) will be related to the total amount of displacement of the plate 22 and, as will be seen hereinafter, to the frictional forces and thus losses experienced between the hull of the ship and the ice. As will be described hereinafter in connection with FIG. 9, the signals S1–S4 and the power for the electromagnetic plate suspension means may be provided to a control and monitoring unit through a cable and a suitable watertight connector. The various signals may be utilized by the control and monitoring unit to supply the desired data.

Another embodiment of the detector assembly 12 of FIG. 1 is illustrated in FIGS. 5 and 6 wherein like numerical designations have been utilized to indicate components previously described. The FIGS. 5 and 6 embodiment may be substantially identical in operation to the FIGS. 3 and 4 embodiment but is mounted in the hull 24 of the ship in a threaded aperture as is indicated generally at 82. Moreover, the detector assembly may be mounted in a hollowed out machined housing 84 threaded into the aperture 82 and welded as shown, and a circular detector plate 22 may be utilized as the force responsive movable member.

Referring now to FIGS. 5 and 6, the plate 22 is suspended for omnidirectional movement from a biased control reference position in a suitable manner such as by the electromagnetic suspension means previously described. Magnetic field sensing means, e.g. the conductors 64–70, are provided along the edges of the plate 22, spaced from the plate by an insulator 72 as in the previously described embodiment. Electrical connections to the various coils and sensors may be made in a conventional manner as through a watertight cable connection 86. Displacement probes (not shown) may be provided, if desired, as a double-check on the accuracy of the magnetically sensed readings or in lieu of the magnetic sensors. An inspection plate 87 may be bolted or otherwise suitable attached to the housing 84 to permit access to the interior of the housing 84.

As will be appreciated by one skilled in the art, the detector of FIGS. 5 and 6 may be readily fitted to the hull of a ship and consititutes a self-contained unit, thereby increasing its effective use in conjunction with existing hulls. Moreover, the unitary design of the FIG. 5 and 6 embodiment facilitates calibration of the unit as is described hereinafter.

An alternative embodiment of the suspension means for the plate 22 of FIGS. 5 and 6, is illustrated in FIG. 6A. Referring now to FIG. 6A, the plate 22 may be suitable secured to a suspension member 90 fabricated from a resilient material. For example, the member 90 may be a solid or slightly hollowed block of neoprene rubber or other material which deforms elastically under stress (i.e. has an elastic memory) and returns to its original shape when the stress is removed. The member 90 is also secured in a suitable manner to the interior of the housing 84.

The suspension means of FIGS. 6A provides for omnidirectional movement of the plate 22 but the retrieving force tending to restore the plate 22 to a reference position (i.e. the centralized position illustrated) is not variable as with the magnetic suspension means. In this connection, one or more pairs of electromagnets may be mounted in aligned positions in cavities in the member 90, as indicated in phantom at 92, to provide for the variation of the retrieving or restoring force.

Figure 7:
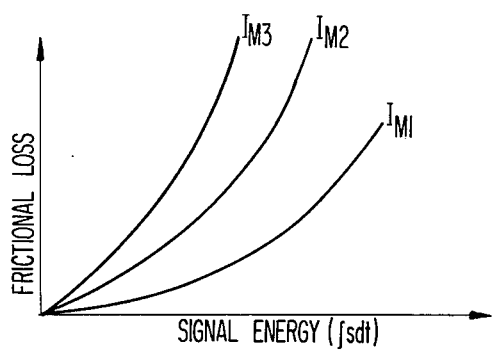
FIGS. 7 and 8 are graphs of illustrative empirical relationships between the signals produced by the detector assembly of FIGS. 1–6 and the frictional losses on the hull of the vessel in the vicinity of the detector assemblies.
Figure 8:
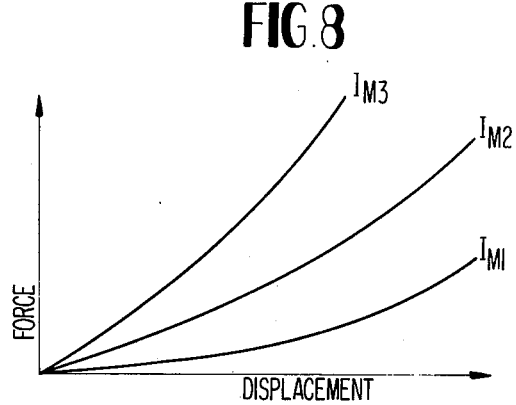

The operation of the detector of FIGS. 1 and 3–6 may be more clearly understood with reference to the previously described drawings and FIGS. 7 and 8. With reference now to FIGS. 1–8, power is applied to the magnetic suspension assembly, i.e. the electromagnets 26 and 30 from a.d.c. source. The pole faces of the electromagnets 26 and 30 are maintained at opposite magnetic polarities and are therefore held together by magnetic attraction.

The natural tendency of the pole faces is to become aligned coaxially since this condition presents a condition of minimum reluctance to lines of magnetic force. Thus, if the electromagnets are moved from the aligned coaxial position by a force applied to the plate 22, a retrieving force tending to restore the magnets to their aligned positions is produced and is applied to the plate 22. The restoring force will be a function of the amount of displacement experienced by the electromagnets relative to each other (i.e. the displacement of the plate 22) and the magnitude of the current supplied to the electromagnets, i.e., the magnetizing current $I_M$.

Advantageously, the field strength of the electromagnets may be varied over a wide range by varying the magnetizing current $I_M$. Variations in field strength will, of course, vary the retrieving force of the electromagnets in accordance with a direct relationship. Thus, the magnetizing current may be set at one value under ice conditions in which relatively small frictional forces are encountered, and the magnetizing current may be increased considerably when relatively large frictional forces are encountered. A variable retrieving force suspension system is thus provided.

Each detector assembly can be calibrated empirically prior to installation in the hull of the ship. For example various forces may be applied to the plate 22 while monitoring the signals S1-S4 and the magnetizing currents $I_M$ supplied to the electromagnets suspending the plate 22. The signal energy resulting from each applied force may then be recorded and plotted for various magnetizing currents $I_{M1}$–$I_{M3}$ as a function of applied force of frictional loss as shown in FIG. 7.

Similarly, the displacement probes of each detector assembly may be calibrated empirically. Forces may be applied to the plate 22 and the actual displacement of the plate may be measured and plotted for various magnetizing currents $I_{M1}$–$I_{M3}$ as shown in FIG. 8. The potentiometer or other displacement signal generators may be calibrated so that, for example, a known linear relationship exists between displacement and output signal voltage. Of course, output signal voltage may be plotted as a function of force for various magnetizing currents if desired.

Having empirically obtained the relationships between the signals supplied by the detector assembly and various applied forces (e.g., frictional forces in terms of frictional losses), the calibrated detector assemblies may be installed in the hull of an ice breaking vessel as described previously. The signals produced by the detector assemblies may then be recorded or otherwise utilized for an analysis of the forces acting on the hull of the vessel under actual ice breaking conditions.

Figure 9:
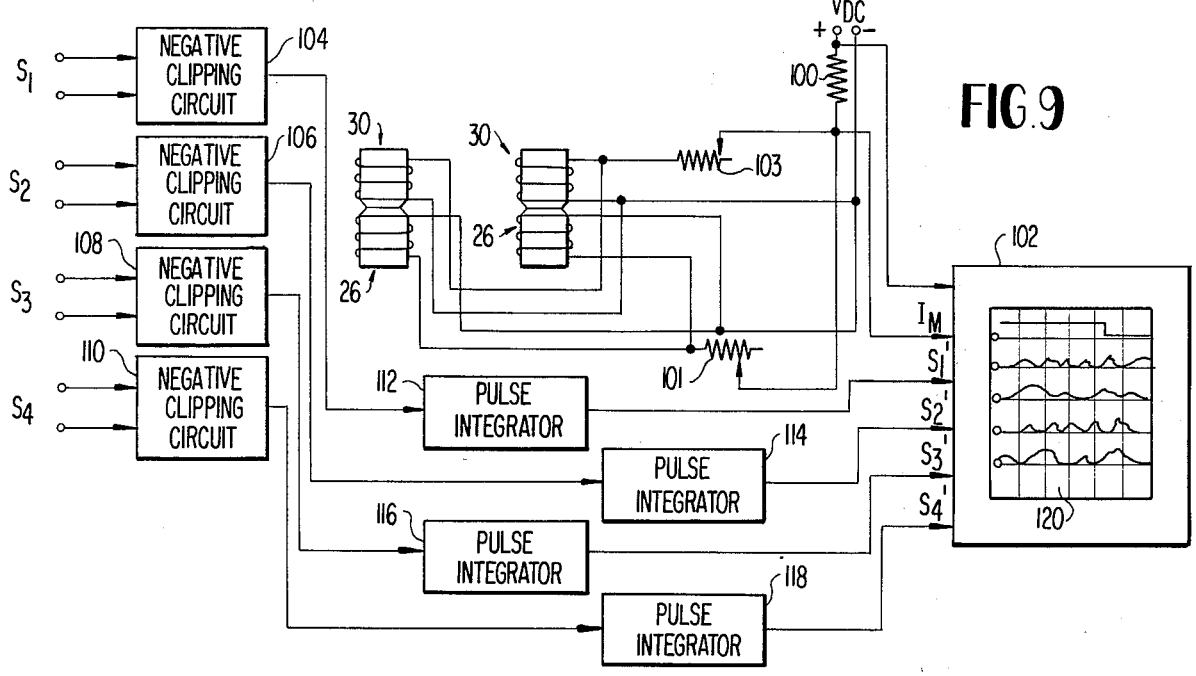
FIG. 9 is a schematic diagram illustrating one embodiment of a control and monitoring unit which my be utilized in conjunction with the detector of FIGS. 1 and 3–6; and, FIG. 10 is a schematic diagram illustrating another embodiment of a control and monitoring unit which may be utilized in conjunction with the detector of FIGS. 1 and 3–6.

For example, as illustrated in FIG. 9, the electromagnets 26 and 30 of the suspension system may be supplied with magnetizing current through a series resistor 100 and respective potentiometers 101 and 103. The voltage across the resistor 100 may be supplied to a suitable conventional charge recorder 102 or other utilization device suitable for analysis of the generated signals. The signals S1–S4 from the detector may be supplied through suitable conventional negative clipping circuits 104–110 and pulse integrators 112–118 to signal input terminals of the recorder 102. Accordingly, the magnetizing current $I_M$ and the integrated positive half cycles of the signals from the movement detectors are recorded as indicated on the chart 120 of the recorder 102.

The recorded data may be correlated with the data obtained empirically prior to installation of the detector assembly and may also be correlated with a record of the type of ice conditions being encountered. From this data, the frictional forces encountered at various locations on the hull of the ship may be compared as an aid in hull design. Moreover, the data obtained may also be compared with similarly obtained data from ice breakers having different hull designs so as to provide design information for optimizing hull design.

It will be appreciated that since all that is required for such design considerations is relative or comparative data, translation of the force or loss data into other forms is not necessary. Moreover, it will be appreciated that the data can be supplied to a computer or other suitable utilization device for analysis, particularly since the data is in the form of electrical signals and may be readily converted to an appropriate digital form for use in computer analysis.

Figure 10:
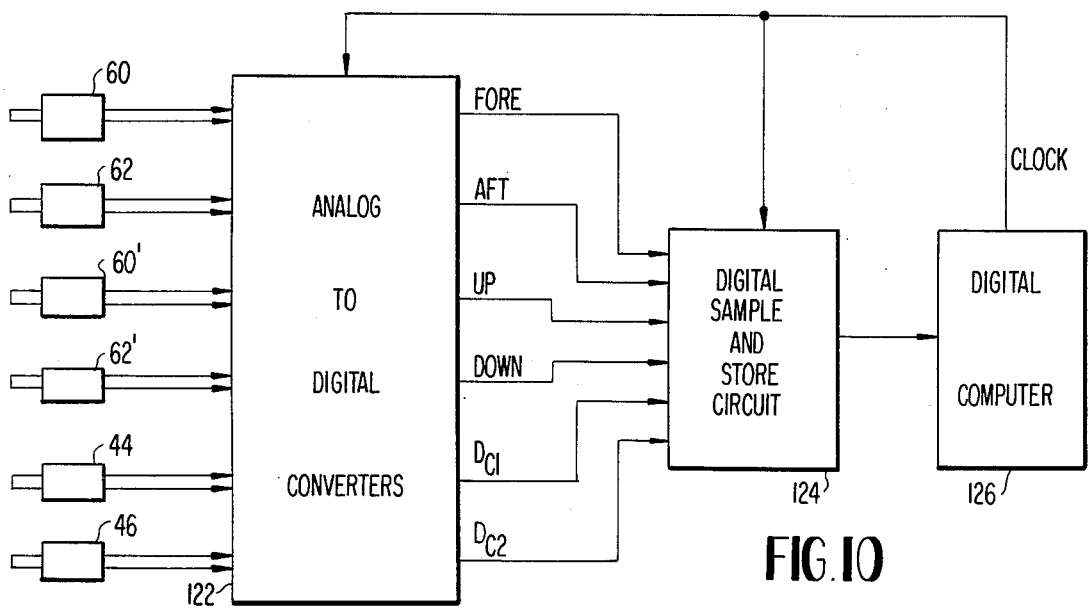

For example, as is illustrated in FIG. 10, signals from the displacement responsive potentiometer 60 and 62 (horizontal displacement), 60' and 62' (vertical displacement), and 44 and 46 (compressive displacement) are d.c. signals which vary directly in amplitude as a function of plate displacement. These potentiometer output signals may be applied to suitable conventional analog to digital converters 122 for conversion into a suitable digital format, e.g., binary or binary coded decimal (BCD). The digital signals indicative of displacement may then be transferred to a suitable conventional digital sample and store circuit 124.

A digital computer 126 may selectively sample the stored signals from the sample and store circuit 124 on a periodic basis (e.g., every second). The sampled signals are indicative of displacement and also bear a predetermined relationship to force as was previously described. Accordingly, the computer 126 may, through conventional techniques, analyze the displacement data in relation to stored force-displacement information for that detector assembly and provide a suitable output, e.g., a print out of frictional forces, frictional horsepower losses or the like.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Apparatus for providing data related to frictional forces experienced on the hull of a vessel as the vessel passes through ice comprising:
    a generally planar plate;
    means for suspending said plate in an aperture in the hull of the vessel generally flush therewith and at a location on the hull which contacts the ice through which the vessel passes, said plate being maintained at a reference position by said suspending means in the absence of forces applied to said plate and being displaceable from said reference position generally in the plane of the hull in response to the application of forces to said plate; and,
    means responsive to displacement of said plate for generating a signal related to the displacement of said plate from said reference position, wherein said plate suspending means comprises:
    first and second electromagnets carried by the hull of the vessel and having pole faces of one magnetic polarity facing outboard of the hull of the vessel; and,
    third and fourth electromagnets having pole faces of a polarity opposite said one polarity, said third and fourth electromagnets being secured to said plate with the pole faces thereof aligned with and in contact with the pole faces of said first and second electromagnets, said plate thereby being movably suspended by magnetic attraction between the pole faces of said electromagnets.

2. The apparatus of claim 1 wherein said first and second electromagnets each include cylindrical cores having pole faces at each end thereof, said cores being mounted for axial movement against resilient biasing forces directed outboard of the hull of the ship vessel, said cores being contacted by displacement means for measuring the axial displacement of said cores from the outboard biased reference position.

3. The apparatus of claim 2 wherein said signal generating means comprises:
    a plurality of displacement probes mounted for displacement in response to displacement of said plate; and,
    mens for generating an electrical signal related in value to the displacement of said displacement probes by said plate.

4. The apparatus of claim 1 wherein said signal generating means comprises:
    a plurality of displacement probes mounted for displacement in response to displacement of said plate; and,
    means for generating an electrical signal related in value to the displacement of said displacement probes by said plate.

5. A method for providing data related to frictional forces experienced on the hull of a vessel as the vessel passes through ice comprising the steps of:
    suspending a plate generally flush with the outboard surface of the hull of the vessel at a location on the hull contacting ice through which the vessel passes, the plate being suspended for omnidirectional displacement generally in the plane of the hull against a force tending to restore the plate to a reference position; and
    generating an electrical signal related in value to the displacement of the plate from the reference position in a plurality of non-parallel directions, the value of the generated signal having a known relationship to displacement of the plate in each of said plurality of directions.

6. The method of claim 5 including the further step of recording the generated signal as a manifestation of frictional force.

7. The method of claim 5 wherein a plurality of plates are suspended at selected locations on the hull of the ship flush with the outboard surface thereof, and wherein at least one of said electrical signals is generated for each plate.

8. Apparatus for providing data related to the ice breaking efficiency of a hull of a ship as the ship passes through ice comprising:
movable means carried on the hull of the ship generally flush with the hull for displacement in response to forces applied thereto as the ship passes through the ice;
means for measuring the displacement of said movable means relative to the hull of the ship as a manifestation of frictional forces between the hull of the ship and the ice;
said movable means comprising a generally planar plate mounted in an aperture in the hull of the ship in generally coplanar relation with the hull, said plate being mounted on a plate suspending means connected to the hull of the ship, said plate suspending means comprising:
first and second electromagnets carried by the hull of the ship and having pole faces of one magnetic polarity facing outboard of the hull of the ship; and
third and fourth electromagnets having pole faces of a polarity opposite said one polarity, said third and fourth electromagnets being secured to said plate with the pole faces thereof aligned with and in contact with the pole faces of said first and second electromagnets, said plate thereby being movably suspended by magnetic attraction between the pole faces of said electromagnets.

9. The apparatus of claim 8 wherein said measuring means comprises:
electromagnetic field producing means carried by one of either said plate or the hull of the ship; and,
electromagnetic field sensing means carried by the other of either said plate or the hull of the ship, said sensing means producing an electrical signal related to the movement of said plate relative to the hull of the ship.

10. The apparatus of claim 9 wherein said electromagnetic field producing means comprises a plurality of electromagnets carried by the hull of the ship and disposed at spaced positions adjacent the edges of said plate, and wherein said electromagnetic field sensing means comprises a plurality of electrical conductors carried by said plate adjacent respective ones of said plurality of electromagnets, said electrical conductors producing electrical signals related to the degree of movement of said plate relative to said plurality of electromagnets.

11. The apparatus of claim 9 wherein said measuring means further includes means for recording frictional losses between the hull of the ship and the ice in response to said produced electrical signal.

12. The apparatus of claim 8 wherein said measuring means comprises:
a plurality of displacement probes mounted for displacement in response to displacement of said movable means; and,
means for measuring the displacement of said displacement probes.

13. The apparatus of claim 8 wherein said first and second electromagnets each include cylindrical cores having pole faces at each end thereof, said cores being mounted for axial movement against resilient biasing forces directed outboard of the hull of the ship, said cores being contacted by displacement means for measuring the axial displacement of said cores from the outboard biased reference position.

14. Apparatus for providing data related to frictional forces experienced on the hull of a vessel as the vessel passes through ice comprising:
a generally planar plate;
means for suspending said plate in an aperture in the hull of the vessel generally flush therewith and at a location on the hull which contacts the ice through which the vessel passes, said plate being maintained at a reference position by said suspending means in the absence of forces applied to said plate and being displaceable omnidirectionally from said reference position generally in the plane of the hull in response to the application of forces to said plate; and,
means responsive to displacement of said plate in at least two nonparallel directions for generating a signal having values with a known relationship to the displacement of said plate from said reference position in said at least two non-parallel directions.

15. The apparatus of claim 14 wherein said signal generating means comprises:
a plurality of displacement probes mounted for displacement in response to displacement of said plate; and,
means for generating an electrical signal related in value to the displacement of said displacement probes by said plate.

16. The apparatus of claim 14 wherein said signal generating means comprises:
first and second electromagnetic field producing means carried by one of either said plate or the hull of the vessel; and,
first and second electromagnetic field sensing means carried by the other of either said plate or the hull of the vessel adjacent said first and second field producing means, said sensing means each producing an electrical signal related to the movement of said plate relative to the hull of said vessel.

17. The apparatus of claim 14 wherein said suspending means includes means for suspending said plate for movement from said reference position generally perpendicular to the plane of said plate, said signal generating means including means for sensing displacement of said plate from said reference position in a direction generally perpendicular to the plane of said plate.

18. The apparatus of claim 14 wherein said signal generating means further includes means for recording frictional losses between the hull of the ship and the ice in response to said generated electrical signal.

* * * * *